(12) United States Patent
Isojima

(10) Patent No.: US 8,817,679 B2
(45) Date of Patent: Aug. 26, 2014

(54) BASE STATION, COMMUNICATION SYSTEM AND COMMUNICATION METHOD

(75) Inventor: Katsuaki Isojima, Yokosuka (JP)

(73) Assignee: Fujitsu Limited, Kawasaki (JP)

(*) Notice: Subject to any disclaimer, the term of this patent is extended or adjusted under 35 U.S.C. 154(b) by 111 days.

(21) Appl. No.: 13/557,509

(22) Filed: Jul. 25, 2012

(65) Prior Publication Data

US 2013/0039198 A1 Feb. 14, 2013

(30) Foreign Application Priority Data

Aug. 12, 2011 (JP) ................................ 2011-177056

(51) Int. Cl.
*H04B 7/00* (2006.01)
(52) U.S. Cl.
USPC ......... 370/310.2; 370/252; 370/328; 714/749
(58) Field of Classification Search
USPC ................................................ 714/714, 749
See application file for complete search history.

(56) References Cited

U.S. PATENT DOCUMENTS

| 8,320,269 | B2* | 11/2012 | Baccelli et al. | 370/252 |
| 8,493,955 | B2* | 7/2013 | Nandagopalan et al. | 370/348 |
| 8,559,557 | B2* | 10/2013 | Hu et al. | 375/316 |
| 2007/0297325 | A1* | 12/2007 | Larsson | 370/216 |

FOREIGN PATENT DOCUMENTS

| JP | 2009-188660 | 8/2009 |
| WO | 2011/030759 | 3/2011 |

* cited by examiner

*Primary Examiner* — Duc C Ho
(74) *Attorney, Agent, or Firm* — Katten Muchin Rosenman LLP

(57) ABSTRACT

A base station includes a receiver configured to receive data wirelessly transmitted from plural mobile stations which repeatedly transmit the data until a reception acknowledgement signal representing that the data has been received by the base station is received, a transmitter configured to wirelessly transmit data to the plural mobile stations, and a controller configured to assign a radio resource for data transmission to a mobile station of the plural mobile stations in accordance with a data transmission request received from the mobile station, make the receiver receive data from the mobile station in the assigned radio resource, when the receiver has received the data from the mobile station make the transmitter transmit the reception acknowledgement signal to the mobile station, and when the radio resource is reassigned in association with the wireless transmission of the reception acknowledgement signal make the transmitter retransmit the reception acknowledgement signal.

12 Claims, 14 Drawing Sheets

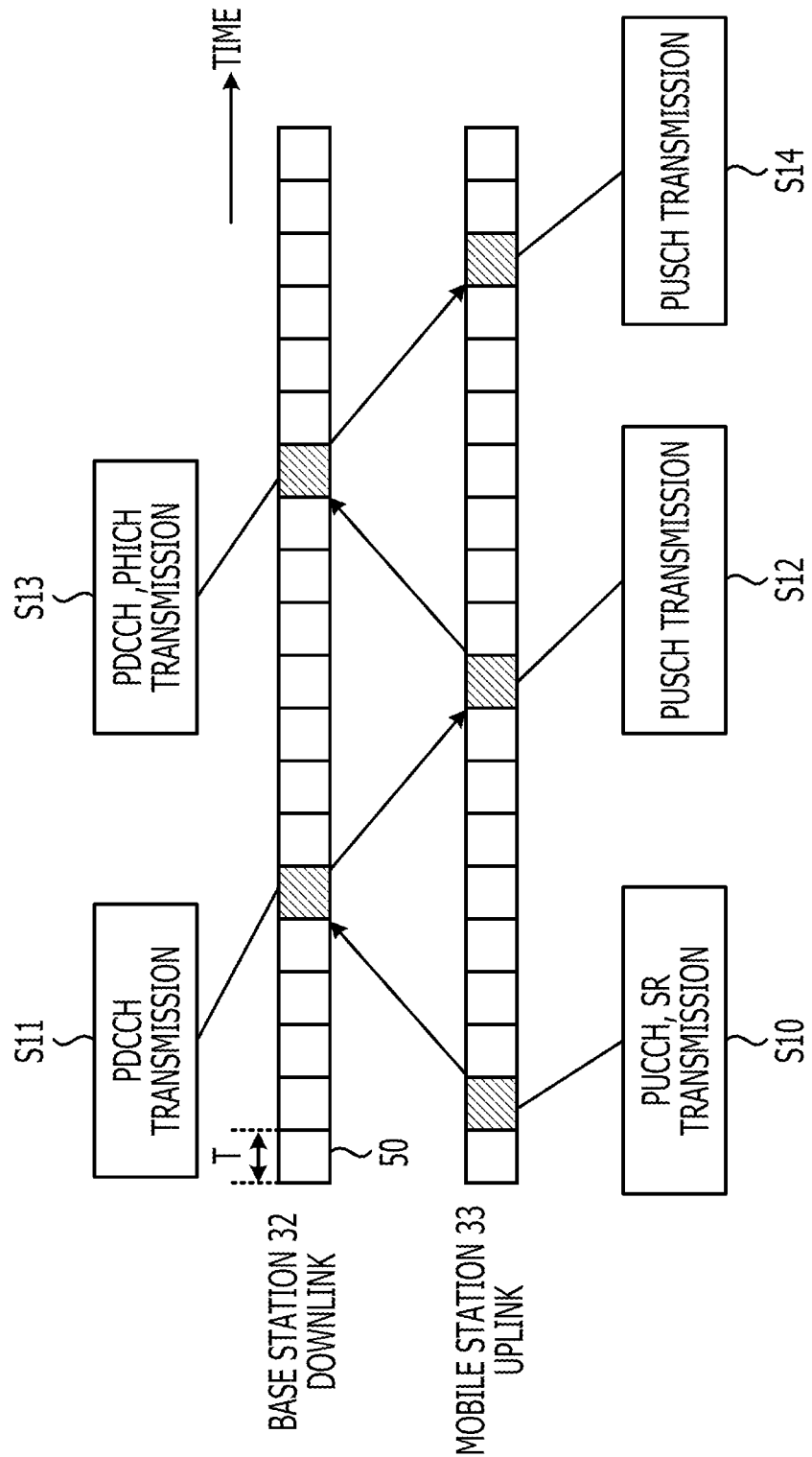

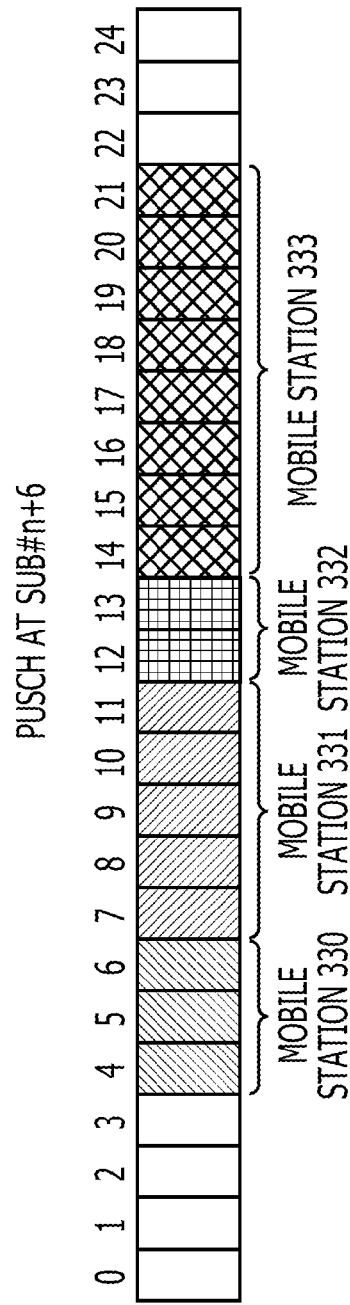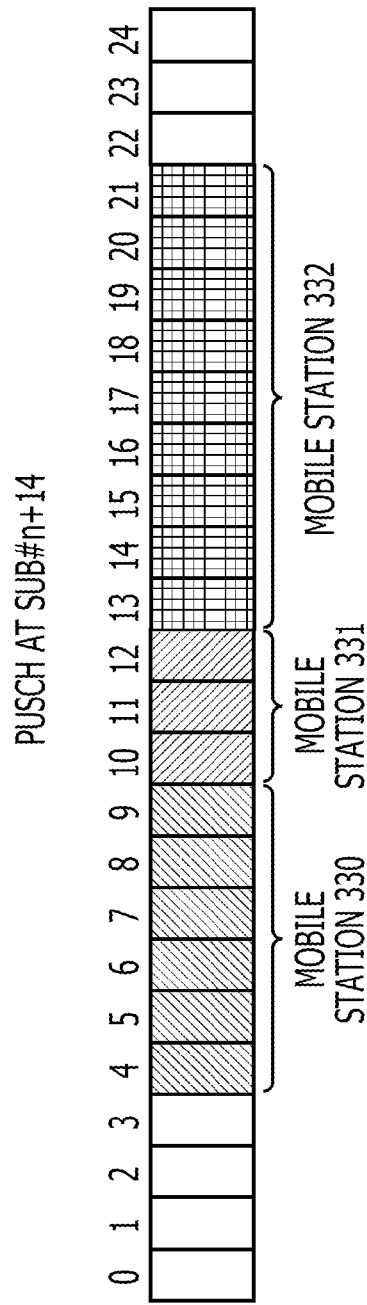

FIG. 7

| RB | 0 | 1 | ... | 12 | 13 | 14 | 15 | 16 | 17 | 18 | 19 | 20 | 21 | 22 | 23 | 24 |
|---|---|---|---|---|---|---|---|---|---|---|---|---|---|---|---|---|
| ... | ... | ... | ... | ... | ... | ... | ... | ... | ... | ... | ... | ... | ... | ... | ... | ... |
| SUB#n+6 | -110 | -110 | ... | -110 | -110 | -110 | -110 | -110 | -110 | -110 | -110 | -110 | -110 | -110 | -110 | -110 |
| ... | ... | ... | ... | ... | ... | ... | ... | ... | ... | ... | ... | ... | ... | ... | ... | ... |
| SUB#n+14 | -110 | -110 | ... | -110 | -110 | -105 | -105 | -105 | -105 | -105 | -105 | -105 | -105 | -110 | -110 | -110 |
| ... | ... | ... | ... | ... | ... | ... | ... | ... | ... | ... | ... | ... | ... | ... | ... | ... |
| SUB#n+22 | -110 | -110 | ... | -110 | -110 | -110 | -110 | -110 | -110 | -110 | -110 | -110 | -110 | -110 | -110 | -110 |

| | MANAGEMENT NUMBER#0 | MANAGEMENT NUMBER#1 | MANAGEMENT NUMBER#2 | ... |
|---|---|---|---|---|
| 80 | 82 | 83 | 84 | |
| ⋮ | ⋮ | ⋮ | ⋮ | ⋮ |
| SUB#n+6 | — | — | — | — |
| ⋮ | ⋮ | ⋮ | ⋮ | ⋮ |
| SUB#n+14 | MOBILE STATION 333, RBs 14 to 21, nDMRS=0 CRC_OK TIMING: SUB#n-6 | — | — | — |
| ⋮ | ⋮ | ⋮ | ⋮ | ⋮ |
| SUB#n+22 | MOBILE STATION 333, RBs 14 to 21, nDMRS=0 CRC_OK TIMING: SUB#n-6 | — | — | — |

86 — SUB#n+6
87 — SUB#n+14
88 — SUB#n+22

FIG. 10

| 90 | | MANAGEMENT NUMBER#0 | MANAGEMENT NUMBER#1 | MANAGEMENT NUMBER#2 | |
|---|---|---|---|---|---|
| | ⋮ | ⋮ | ⋮ | ⋮ | ⋮ |
| 96 ⌇ SUB#n+6 | | MOBILE STATION 330, RECEPTION SIR=xx[dB] | MOBILE STATION 331, RECEPTION SIR=yy[dB] | MOBILE STATION 332, RECEPTION SIR=xx[dB] | — |
| | ⋮ | ⋮ | ⋮ | ⋮ | ⋮ |
| 97 ⌇ SUB#n+14 | | — | — | — | — |
| | ⋮ | ⋮ | ⋮ | ⋮ | ⋮ |
| 98 ⌇ SUB#n+22 | | — | — | — | — |

92 — 93 — 94

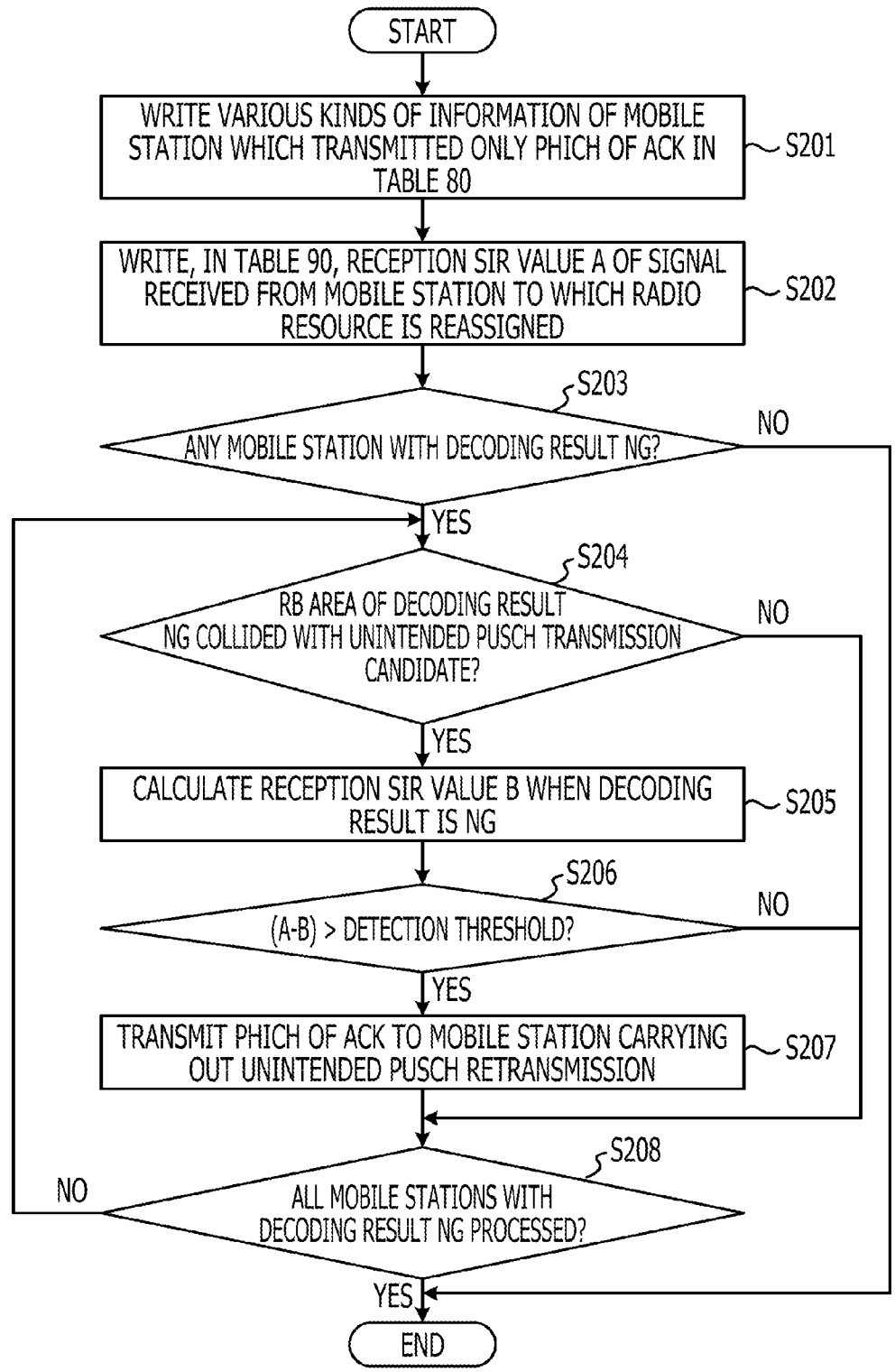

BASE STATION, COMMUNICATION SYSTEM AND COMMUNICATION METHOD

CROSS-REFERENCE TO RELATED APPLICATION

This application is based upon and claims the benefit of priority of the prior Japanese Patent Application No. 2011-177056, filed on Aug. 12, 2011, the entire contents of which is incorporated herein by reference.

FIELD

Embodiment discussed herein relates to a base station that carries out wireless communication, a communication system, and a communication method.

BACKGROUND

A base station which carries out wireless communication with plural mobile stations, for example, assigns a radio resource, in which data transmission is permitted, on the time basis in response to a request for wireless transmission from a mobile station so that no interference occurs between wireless signals transmitted wirelessly from the plural mobile stations.

In the Long Team Evolution (LTE) of the 3rd Generation Partnership Project (3GPP), 12 subcarriers transmitted in a wireless zone are handled as a single resource block (RB). The base station assigns a communication frequency band on the RB basis for each mobile station. The frequency band assigned on the RB basis is a radio resource of each mobile station.

Each mobile station transmits data to the base station using the assigned radio resource. The base station decodes the received data and carries out an error correction decoding process to the decoded data. If the decoding process has successfully been completed, the base station transmits an acknowledgement (ACK) signal to the mobile station which has transmitted the data. The ACK signal is a reception acknowledgement signal used for the acknowledgement of reception of the data. If the decoding process has not been successfully completed, a negative acknowledgement (NACK) signal is transmitted to the mobile station which has transmitted the data.

The mobile station which received the ACK signal temporarily stops the transmission process, regarding that the transmission data has been successfully received by the base station. The mobile station which received the NACK signal transmits the same data again to the base station using a radio resource determined in accordance with a rule that the base station and the mobile station already know, regarding that the transmission data has not been successfully received by the base station. The mobile station repeats transmission of the same data until the mobile station receives the ACK signal.

In a case in which the base station transmitted the ACK signal but the mobile station has not successfully received the ACK signal due to, for example, an environmental influence of the wireless communication, the mobile station carries out a retransmission process of the data regarding that the mobile station has received a NACK signal. Repeated transmission of the same data decreases system throughput. For example, Japanese Laid-open Patent Publication No. 2009-188660 describes a technique to reduce the frequency of occurrence of retransmission by reducing occurrence of erroneous determination regarding the ACK signal which has been transmitted to the mobile station from the base station.

SUMMARY

According to an aspect of the invention, a base station includes a receiver configured to receive data wirelessly transmitted from plural mobile stations which repeatedly transmit the data until a reception acknowledgement signal representing that the data has been received by the base station is received, a transmitter configured to wirelessly transmit data to the plural mobile stations, and a controller configured to assign a radio resource for data transmission to a mobile station of the plural mobile stations in accordance with a data transmission request received from the mobile station, make the receiver receive data from the mobile station in the assigned radio resource, when the receiver has received the data from the mobile station make the transmitter transmit the reception acknowledgement signal to the mobile station, and when the radio resource is reassigned in association with the wireless transmission of the reception acknowledgement signal make the transmitter retransmit the reception acknowledgement signal to the mobile station.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating a communication procedure of uplink data from the mobile station to the base station;

FIG. 5A illustrates a result of PUSCH transmission from each mobile station to the base station on the RB basis at the subframe SUB#n+6;

FIG. 5B illustrates a result of PUSCH transmission from each mobile station to the base station on the RB basis at the subframe SUB#n+14;

FIG. 7 is an interference power management table used to manage interference power on the RB basis;

FIG. 8 is a retransmission prediction management table to predict unintended PUSCH retransmission by the mobile station which has transmitted the PHICH of the ACK signal used by the mobile station;

FIG. 10 is an SIR management table used to manage SIR of a signal received from the mobile station to which the radio resource has been reassigned; and FIG. 11 is an ACK retransmission process flow of the controller of the base station.

DESCRIPTION OF EMBODIMENT

Hereinafter, an embodiment will be described. Combinations of the configurations according to the embodiment are included in the embodiment.

While inventing the present embodiment, observations were made regarding a related art. Such observations include the following, for example.

In a communication system of a related art, if erroneous determination still occurs after the erroneous determination regarding the ACK signal is reduced, the mobile station retransmits the same data using a radio resource determined in accordance with a rule that the base station and the mobile station already know. If another mobile station receives the ACK signal successfully, the other mobile station transmits other data to the base station using a radio resource newly assigned by the base station.

If the newly assigned radio resource includes a radio resource used for transmission from a mobile station which has not successfully received the ACK signal, two mobile stations transmit data to the base station using the same radio resource. If two mobile stations transmit data at the same time using the same radio resource, data interference may occur. Data interference may cause one of data signals to be noise for another of the data signals. Since the noise disturbs successful reception of the data by the base station, the base station transmits to the mobile station a NACK signal to request retransmission of the data. The mobile station which received the NACK signal makes retransmission of the same data using the same radio resource. The same operation is repeated unless the retransmission process of the mobile station is completed; therefore, system throughput is decreased.

Figure 1:
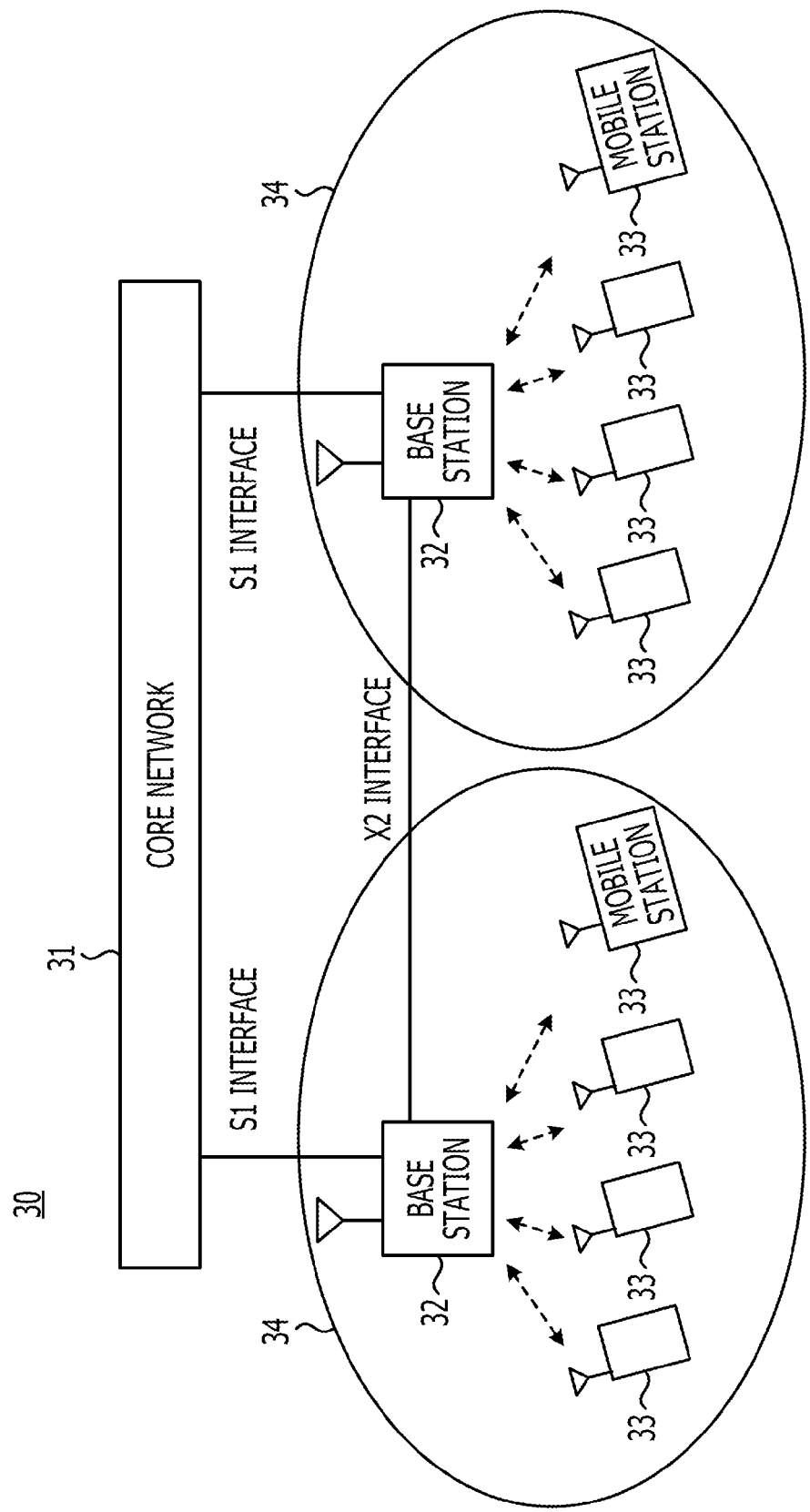
FIG. 1 is a block diagram of a communication system.

FIG. 1 is a block diagram of a communication system 30 according to the embodiment. The communication system 30 is provided with a core network 31, base stations 32, and mobile stations 33. The core network 31 is a large-capacity trunk communication line for intercarrier communications. Each base station 32 carriers out wireless communication with the mobile stations 33. Each mobile station 33 is a mobile wireless terminal which carries out data communication with another mobile station 33.

In the Long Team Evolution (LTE), the core network 31 and each base station 32 are connected to each other in a transmission path called 51 interface. The base stations 32 are mutually connected in a transmission path called X2 interface. A cell 34 is an area in which a base station 32 may carry out wireless communication with a mobile station 33.

One mobile station 33 may communicate with another mobile station 33 via the base station 32 and the core network 31.

Figure 2:
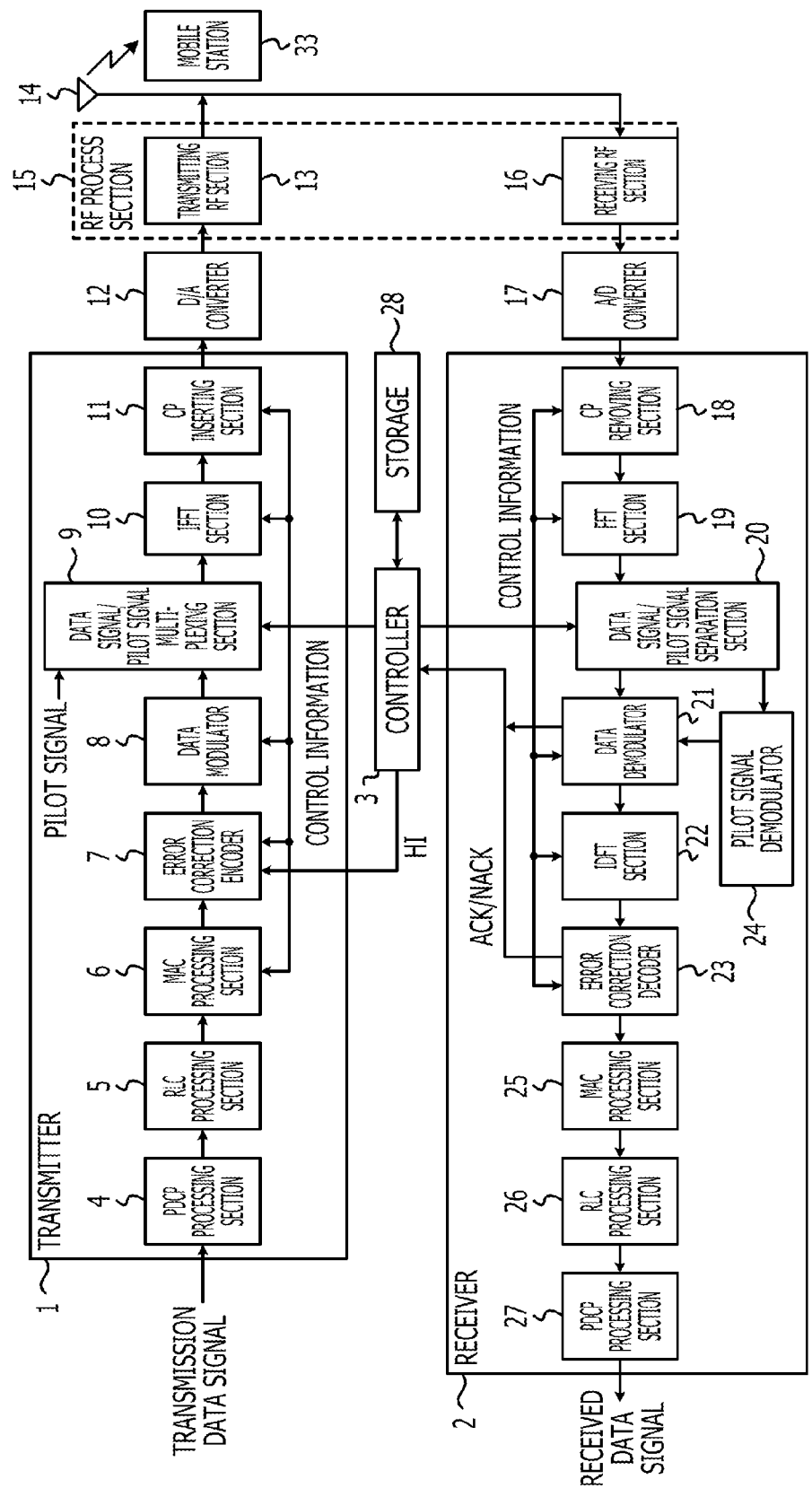
FIG. 2 is a detailed block diagram of a base station.

FIG. 2 is a detailed block diagram of the base station 32. The base station 32 is provided with a transmitter 1, a receiver 2, a controller 3, a D/A converter 12, an A/D converter 17, an RF processor 15, and an antenna 14.

The transmitter 1 carries out a transmission process to a downlink signal. The receiver 2 carries out a reception process to an uplink signal. The controller 3 manages selection of a mobile station 33 with which the base station 32 communicates, and assignment of a radio resource. A storage 28 is used to store data written by the controller 3. The D/A converter 12 converts a digital signal output from the transmitter 1 into an analog signal, and outputs the converted analog signal to the RF processor 15. The A/D converter 17 converts an analog signal output from the RF processor 15 into a digital signal, and outputs the converted digital signal to the receiver 2. The RF processor 15 converts a data signal into a signal suited for radio transmission. The antenna 14 transmits and receives wireless signals.

The transmitter 1 is provided with a packet data convergence protocol (PDCP) processing section 4, a radio link control (RLC) processing section 5, a medium access control (MAC) processing section 6, an error correction encoder 7, a data modulator 8, a data signal/pilot signal multiplexing section 9, an inverse fast Fourier transform (IFFT) section 10, and a cyclic prefix (CP) inserting section 11.

The PDCP processing section 4 converts a PDCP service data section (SDU) received from a wired transmission path into a PDCP protocol data section (PDU). The RLC processing section 5 handles the input PDCP PDU as an RLC SDU, and converts the input PDCP PDU into an RLC PDU. The MAC processing section 6 handles the input RLC PDU as an MAC SDU, and converts the input RLC PDU into an MAC PDU. The error correction encoder 7 carries out an error correction encoding process with respect to the input MAC PDU. The error correction encoder 7 carries out an encoding process with respect to a HARQ indicator (HI) notified by the controller 3.

The PDU is a frame format of the data handled in each layer. The SDU is a service for creating the PDU: a service for creating the PDU of a certain layer is provided by a SDU of upper layer of the PDU of the same layer.

The hybrid automatic repeat request (HARQ) is a scheme to improve error correcting capability by combining the automatic repeat request (ARQ) scheme and the forward error correction (FEC) scheme at the second or lower layer, and to reduce the number of retransmission. The ARQ is a scheme with which the mobile station 33 which received a wrong frame requests the transmitting side to retransmit the frame. The FEC is an error correcting scheme to previously encode the transmission data for error correction such that, if an error occurs during transmission, the error in decoding of data in a decoding process is corrected by the receiving side.

For example, in 3GPP LTE, the base station notifies each mobile station 33 of a reception result using a physical hybrid-ARQ indicator channel (PHICH) signal which is a downlink physical layer signal, with respect to the data regarding a process to handle an uplink-HARQ received from the mobile station 33.

The data modulator 8 carries out a data modulation process, such as quadrature phase shift keying (QPSK) modulation, to the encoded data signal. The data modulator 8 maps the encoded HI to the PHICH signal. The data signal/pilot signal multiplexing section 9 carries out time multiplexing of the data signal and the pilot signal. Here, the pilot signal is a signal known in the mobile station 33 which is the receiving station.

The IFFT section 10 carries out an IFFT process on the basis of N samples (N is a fixed number). That is, the IFFT section 10 considers the N data samples as subcarrier signal components, carries out the IFFT process to the subcarrier components, and converts the subcarrier components into discrete time signals. The CP inserting section 11 inserts the CP at the leading end of the N samples. Here, the CP is a copy of rear M samples (M<N) among N samples after the IFFT process. Since the CP is copied cyclically, the signals continue in the section of the (M+N) samples after the CP is inserted. This characteristic enables the CP to remove interference due to a delayed symbol from a neighboring path.

The receiver 2 is provided with a CP removing section 18, an FFT section 19, a data signal/pilot signal separation section 20, a data demodulator 21, an inverse discrete Fourier transform (IDFT) section 22, an error correction decoder 23, a pilot/signal demodulator 24, an MAC processing section 25, an RLC processing section 26, and a PDCP processing section 27.

The CP removing section 18 removes the CP from a received signal which has been converted into a digital signal by the A/D converter 17. The FFT section 19 carries out a FFT process to the received signal. The data signal/pilot signal separation section 20 separates the FFT-processed received signal into a data signal and a pilot signal. A pilot signal demodulator 24 demodulates the separated pilot signal. The data demodulator 21 demodulates the data signal in accordance with the demodulated pilot signal. The pilot signal demodulator 24 functions as a detection section which calculates received signal power and interference power in accordance with the separated pilot signal. The pilot signal demodulator 24 transmits the calculation result to the controller 3. The received signal power is power of the signal received from the mobile station from which the signal is to be received. The interference power is calculated by subtracting the received signal power from the received power, and is the noise interfering with the received data signal.

The IDFT section 22 carries out an IDFT process of the demodulated data signal. The error correction decoder 23 carries out a decoding process including an error correction process of the data signal. The error correction decoder 23 outputs, to the controller 3, an ACK signal or a NACK signal which is the decoding result of the data signal.

The MAC processing section 25 handles the demodulated and decoded data signal as a MAC PDU and converts the same into a MAC SDU. The RLC processing section 26 handles the MAC SDU as an RLC PDU, and converts the same into an RLC SDU. The PDCP processing section 27 handles the RLC SDU as a PDCP PDU, and converts the same into a PDCP SDU. The PDCP processing section 27 outputs data signal which has been converted into the PDCP SDU to the wired transmission path.

The controller 3 calculates a reception signal to interference ratio (SIR) in accordance with the received signal power and the interference power calculated by the pilot signal demodulator 24. The SIR is a kind of signal to noise ratio representing the quality of the received data. The controller 3 writes the calculated reception SIR in an SIR management table 90 of the storage 28 which will be described later. The controller 3 notifies the error correction encoder 7 of the HI as HARQ control in a HARQ process in accordance with the ACK/NACK signal output from the error correction decoder 23. Details of the HARQ control will be described later. The controller 3 writes the input interference power in an interference power management table 70 of the storage 28 which will be described later.

The RF processor 15 is provided with a transmitting RF section 13 and a receiving RF section 16. The transmitting RF section 13 converts a baseband signal into a radio frequency signal, and outputs the converted signal to the antenna 14. The receiving RF section 16 converts the radio frequency band signal received by the antenna 14 into a baseband signal.

As described above, the base station 32 transmits the data signal output from the wired transmission path to the mobile station 33 and, at the same time, outputs the data signal received from the mobile station 33 to the wired transmission path.

Figure 3:
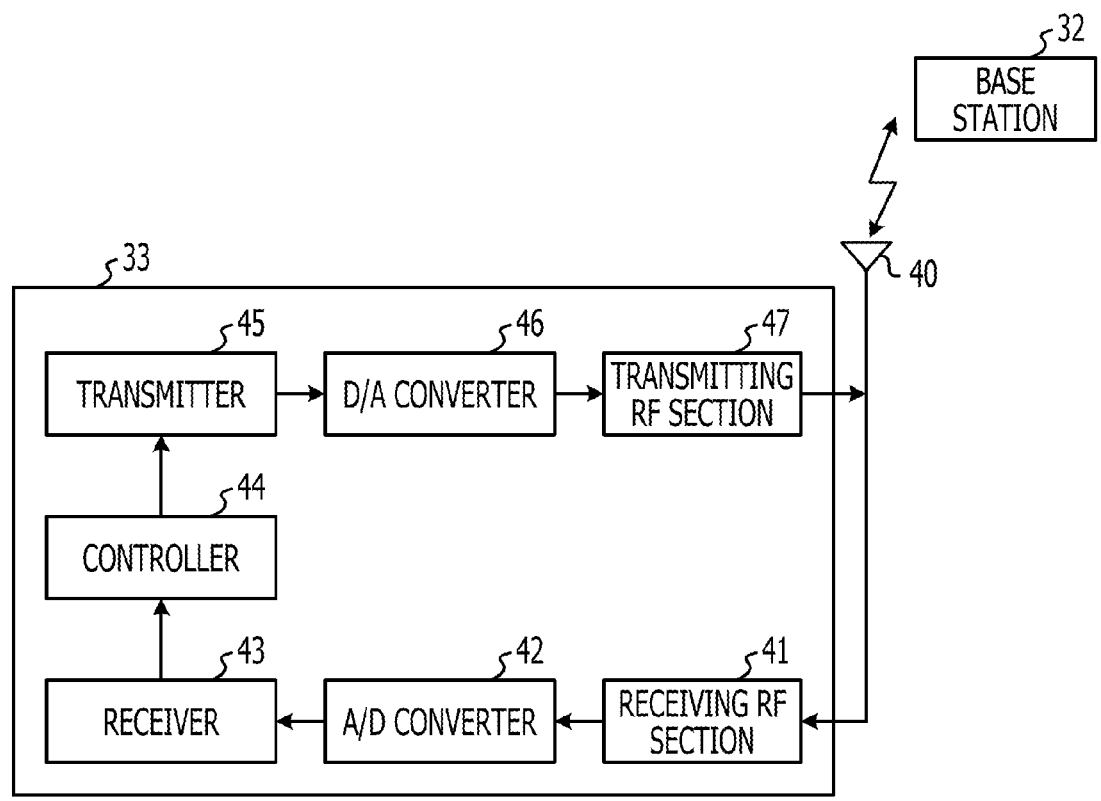
FIG. 3 is a detailed block diagram of a mobile station.

FIG. 3 is a detailed block diagram of a mobile station 33. Each mobile station 33 has the same configuration. The mobile station 33 carries out wireless communication with the base station 32. The mobile station 33 is provided with an antenna 40, a receiving RF section 41, an A/D converter 42, a receiver 43, a controller 44, a transmitter 45, a D/A converter 46, and a transmitting RF section 47.

The antenna 40 receives a signal transmitted from the base station 32. The receiving RF section 41 converts the received radio frequency band signal into a received baseband signal. The A/D converter 42 converts a received analog signal into a digital signal. The receiver 43 carries out a demodulation/decoding process of the received signal which has been converted into a digital signal.

The controller 44 controls data transmit timing of the transmitter 45 in accordance with the received signal which has been demodulated and decoded in the receiver 43.

The transmitter 45 outputs a data signal which has been modulated and encoded in accordance with a control signal input from the controller 44. The D/A converter 46 converts a digital data signal into an analog signal to be transmitted. The transmitting RF section 47 converts the baseband data signal into a radio frequency band signal. The antenna 40 carries out wireless transmission of the data signal converted into radio frequency band.

As described above, the mobile station 33 may carry out wireless transmission of the data signal in accordance with transmit timing information received from the base station 32.

FIG. 4 is a diagram illustrating a communication procedure of transmitting uplink data from the mobile station 33 to the base station 32. Each of plural boxes arranged in two horizontal lines in FIG. 4 represents a subframe 50. In FIG. 4, the communication process is carried out from the left to the right. The length of time of a single subframe 50 is T. The subframe here is a section of transmitted data.

LTE employs the single carrier-frequency division multiple access (SC-FDMA) transmission scheme for the uplink data communication. The peak to average power ratio (PAPR) of the SC-FDMA transmission scheme is smaller than that of the orthogonal frequency division multiplexing (OFDM) transmission scheme. Therefore, the SC-FDMA transmission scheme increases efficiency of a transmission amplifier of the mobile station 33 and thereby reduces power consumption. The PAPR here is a value representing variation in power fluctuation of the data signal.

Each mobile station 33 issues an assignment request of the radio resource to the base station 32 by transmitting a scheduling request (SR) with a physical uplink control channel (PUCCH) signal. The base station 32 specifies the mobile station 33 which made a transmission request in accordance with the received SR (step S10).

Regarding the mobile station 33 which transmitted the SR, the base station 32 encodes, after demodulating the received SR, the downlink control information (DCI) which is assignment information of the radio resource and maps the information to the physical downlink control channel (PDCCH). The base station 32 carries out wireless transmission of the PDCCH to which the DCI is mapped (step S11).

The mobile station 33 which received the PDCCH extracts the DCI information addressed thereto from the PDCCH. The mobile station 33 distinguishes the radio resource information which the base station 32 assigned in accordance with the extracted DCI information. The mobile station 33 uses the distinguished radio resource to transmit the physical uplink shared channel (PUSCH) to the base station 32 (step S12). The PUSCH is shared by plural mobile stations 33. The PUSCH is used for transmission of data and control information of an upper layer.

The base station 32 which received the PUSCH carries out the decoding process. The controller 3 of the base station 32 carries out HARQ control in accordance with the decoding result. The HARQ control has three patterns in accordance with the control result. The base station 32 transmits the PDCCH or the PHICH in accordance with the result of the HARQ control (step S13).

Three patterns of the HARQ control are as follows. The first pattern: if a new transmission request is issued to the HARQ process as a result of the HARQ control, the base station 32 transmits the PDCCH to which a new data indicator (NDI) which is one kind of the DCI information is toggled. The second pattern: if a retransmission request is issued to the HARQ process as a result of the HARQ control, the base station 32 selects, depending on the situation, non-adaptive-HARQ retransmission which transmits the NACK signal in the PHICH or adaptiveHARQ retransmission which transmits the PDCCH to which the NDI is not toggled. The third pattern: if a transmission stop request is issued to the HARQ process as a result of the HARQ control, the base station 32 transmits the ACK signal in the PHICH.

The mobile station 33 carries out the HARQ control in accordance with the PDCCH or the PHICH received from the base station 32. The mobile station 33 determines in the HARQ control whether or not the PUSCH is to be transmitted (step S14). The HARQ control in the mobile station 33 has the following four patterns. The first pattern: if a new transmission request is received from the base station 32, the mobile station 33 transmits the PUSCH in accordance with the newly received DCI information after encoding the new data. The second pattern: if a non-adaptiveHARQ retransmission request is received from the base station 32, the mobile station 33 transmits the PUSCH by carrying out a hopping process of the RB in accordance with the latest DCI information after encoding retransmitted data. The third pattern: if adaptive-HARQ retransmission request is received from the base station 32, the mobile station 33 transmits the PUSCH in accordance with the newly received DCI information after encoding the retransmitted data. The fourth pattern: if a transmission stop request is received from the base station 32, the mobile station 33 stores the data in a HARQ buffer instead of transmitting the PUSCH.

As described above, the mobile station 33 may transmit data to the base station 32 in accordance with the HARQ control.

Figure 5C:
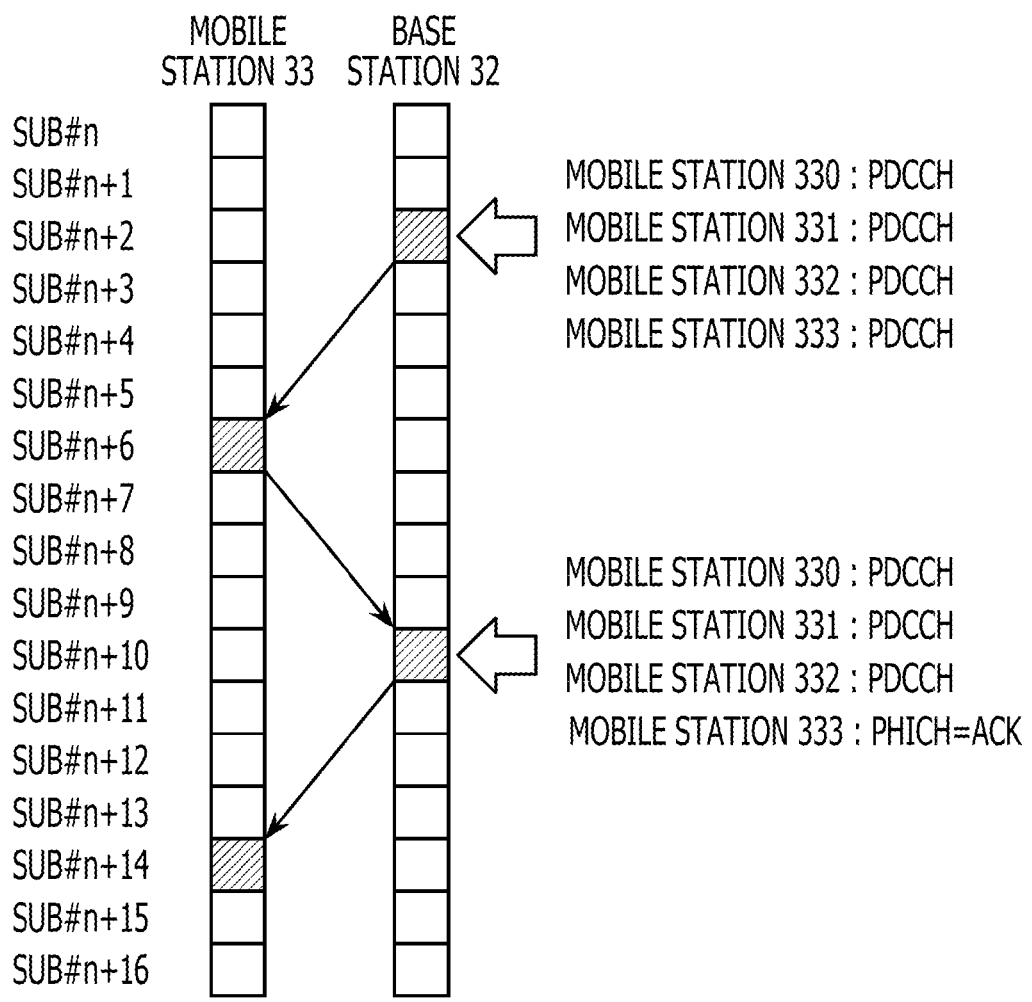
FIG. 5C illustrates communication between each mobile station and the base station on the subframe basis.

FIGS. 5A to 5C illustrate exemplary normal scheduling when the base station 32 communicates with plural mobile stations 33. In FIGS. 5A to 5C, the base station 32 communicates with plural mobile stations 330, 331, 332 and 333. FIG. 5A illustrates a result of PUSCH transmission from each mobile station 33 to the base station 32 on the RB basis at the subframe SUB#n+6. FIG. 5B illustrates a result of PUSCH transmission from each mobile station 33 to the base station 32 on the RB basis at the subframe SUB#n+14. FIG. 5C illustrates communication between each mobile station 33 and the base station 32 on the subframe basis.

As illustrated in FIG. 5C, the base station 32 transmits the PDCCH which is a new transmission request to each mobile station 33 at the timing of the subframe SUB#n+2. The resource blocks assigned to respective mobile stations 33 at the subframe SUB#n+6 in accordance with the PDCCH transmitted from the base station 32 are illustrated in FIG. 5A.

At the subframe SUB#n+6, as illustrated in FIG. 5A, resource blocks RB4 to RB6 are assigned to the mobile station 330, the resource blocks RB7 to RB11 are assigned to the mobile station 331, the resource blocks RB12 and RB13 are assigned to the mobile station 332, and the resource blocks RB14 to RB21 are assigned to the mobile station 333.

As illustrated in FIG. 5C, the base station 32 receives the PUSCH transmitted from each mobile station 33 at the subframe SUB#n+6. If the decoding result of all the signals received from each mobile station 33 is normal, at the subframe SUB#n+10, the base station 32 transmits the PDCCH which is a transmission request of new data to the mobile stations 330 to 332, and transmits an ACK signal for the notification of the completion of data reception as the PHICH to the mobile station 333 in accordance with the decoding result.

As illustrated in FIG. 5B, the RBs are assigned, in accordance with the PDCCH transmitted from the base station 32, to respective mobile stations 33 at the subframe SUB#n+14 which is after the HARQ RTT timer in the HARQ process to which the transmission data at the subframe SUB#n+6 belongs.

As illustrated in FIG. 5B, at the subframe SUB#n+14, the resource blocks RB4 to RB9 are assigned to the mobile station 330, the resource blocks RB10 to RB12 are assigned to the mobile station 331, and the resource blocks RB13 to RB21 are assigned to the mobile station 332. Since data transmission of the mobile station 333 is completed, no RB is assigned to the mobile station 333. Each of the mobile stations 330 to 332 which received the PDCCH representing a new transmission request from the base station 32 transmits the PUSCH at the subframe SUB#n+14. The mobile station 333, received the PHICH of the ACK signal which is a transmission stop request does not transmit the PUSCH.

As described above, the base station 32 and plural mobile stations 33 may carry out data communication while appropriately changing the RBs assigned to the mobile stations 33.

Figure 6A:
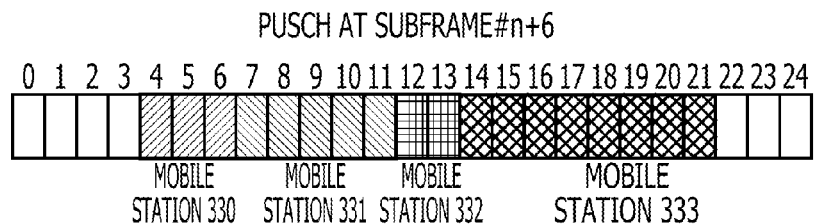
FIG. 6A illustrates a result of PUSCH transmission from each mobile station to the base station on the RB basis at the subframe SUB#n+6.
Figure 6B:
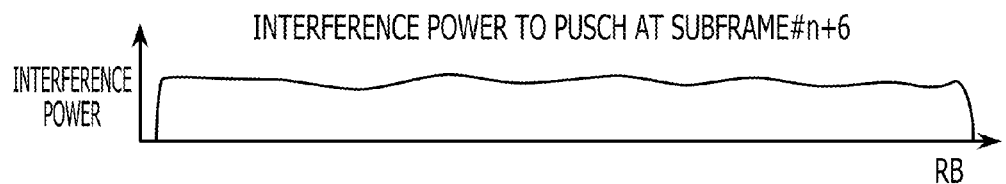
FIG. 6B illustrates a measurement result of interference power in the base station with respect to the PUSCH at the subframe SUB#n+6.
Figure 6C:
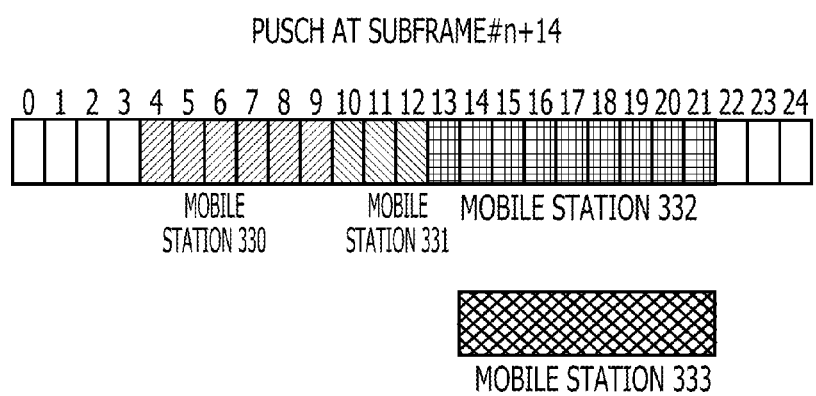
FIG. 6C illustrates a result of PUSCH transmission from each mobile station to the base station at the subframe SUB#n+14 on the RB basis.
Figure 6D:
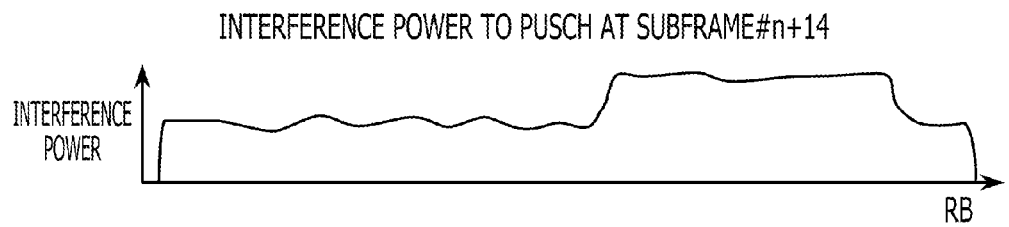
FIG. 6D illustrates a measurement result of interference power in the base station with respect to the PUSCH at the subframe SUB#n+14.
Figure 6E:
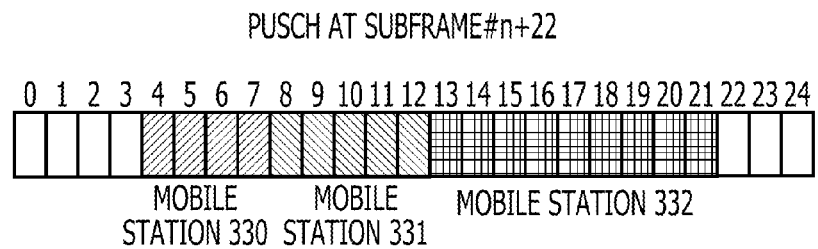
FIG. 6E illustrates a result of PUSCH transmission from each mobile station to the base station at the subframe SUB#n+22 on the RB basis.
Figure 6F:
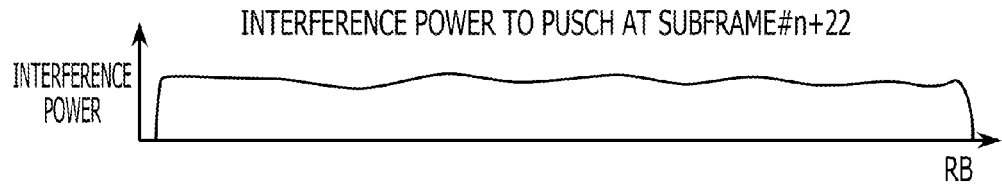
FIG. 6F is a measurement result of interference power in the base station with respect to the PUSCH at the subframe SUB#n+22.
Figure 6G:
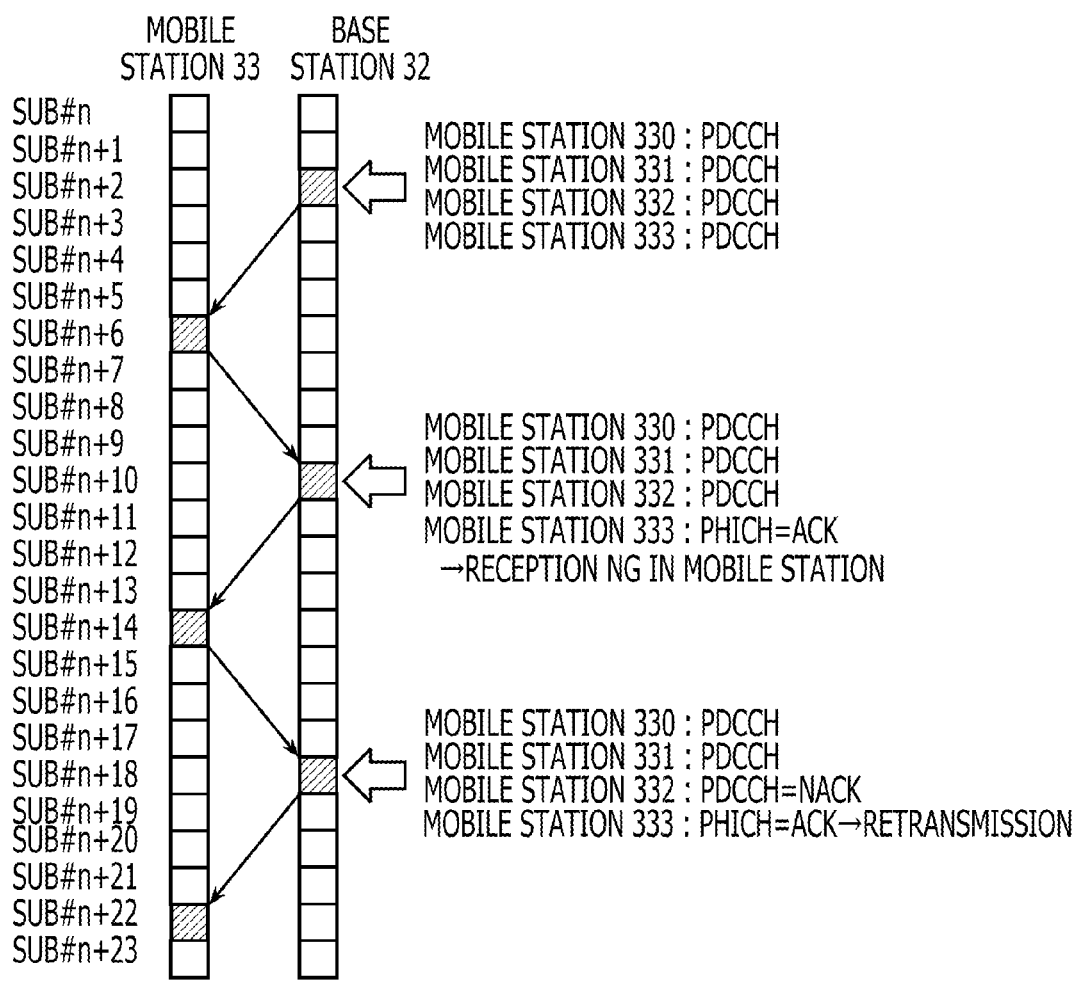
FIG. 6G illustrates communication between each mobile station and the base station on the subframe basis.

FIGS. 6A to 6G illustrate exemplary abnormal scheduling when the base station 32 communicates with plural mobile stations 33. As illustrated in FIGS. 6A to 6G, the Base station 32 communicates with plural mobile stations 330, 331, 332 and 333. FIG. 6A illustrates a result of PUSCH transmission from each mobile station 33 to the base station 32 on the RB basis at the subframe SUB#n+6. FIG. 6B illustrates a measurement result of interference power in the base station 32 with respect to the PUSCH at the subframe SUB#n+6. In FIG. 6B, the horizontal axis corresponds to each RB in FIG. 6A. FIG. 6C illustrates a result of PUSCH transmission from each mobile station 33 to the base station 32 at the subframe SUB#n+14 on the RB basis. FIG. 6D illustrates a measurement result of interference power in the base station 32 with respect to the PUSCH at the subframe SUB#n+14. In FIG. 6D, the horizontal axis corresponds to each RB in FIG. 6C. FIG. 6E illustrates a result of PUSCH transmission from each mobile station 33 to the base station 32 at the subframe SUB#n+22 on the RB basis. FIG. 6F is a measurement result of interference power in the base station 32 with respect to the PUSCH at the subframe SUB#n+22. In FIG. 6F, the horizontal axis corresponds to each RB in FIG. 6E. FIG. 6G illustrates communication between each mobile station 33 and the base station 32 on the subframe basis. As illustrated in FIG.

6G, the base station 32 and each mobile station 33 carry out communication in the same manner as that illustrated in FIG. 5C until the subframe SUB#n+10.

In this embodiment, the interference power is calculated in the following manner. The mobile station 33 carries out time multiplexing of a demodulation reference signal (RS) in accordance with the rule of the 3GPP at the time of PUSCH transmission. The RS is a signal which includes a particular bit pattern and is commonly recognized by the base station 32 and the mobile station 33. The base station 32 checks a correlation between the received power and the RS. If the received power correlates with the RS, the base station 32 acknowledges the received power as received signal power. The base station 32 may calculate interference power by obtaining the difference between the received power and the acknowledged received signal power. This means that, in addition to the power of signal received from mobile stations other than the mobile station 33 which is expected to receive the signal, the interference power includes power of, for example, signals transmitted and received in other cells 34 or signals transmitted and received in another system.

As illustrated in FIG. 6A, each mobile station 33 transmits the PUSCH to the base station 32 at the subframe SUB#n+6 in the same manner as illustrated in FIG. 5A. As illustrated in FIG. 6B, the measurement results of the interference power in the base station 32 which received the PUSCH from each mobile station 33 at the subframe SUB#n+6 are substantially the same between the RBs.

As illustrated in FIG. 6G, the base station 32 transmits the PHICH of the ACK signal to the mobile station 333 at the subframe SUB#n+10 in the same manner as illustrated in FIG. 5C. Now, it is assumed that the mobile station 333 does not normally receive the PHICH of the ACK signal transmitted from the base station 32. In that case, the mobile station 333 determines that the PUSCH transmitted to the base station 32 at the subframe SUB#n+6 is not normally received by the base station 32, and carries out non-adaptiveHARQ retransmission control. Then, the PUSCH is retransmitted at the subframe SUB#n+14 using the same RB14 to RB21 as the RBs that are assigned at the subframe SUB#n+6.

At the subframe SUB#n+10, the base station 32 transmits the PDCCH for newly assigning RBs to the mobile stations 330 to 332 as illustrated in FIG. 6G. The RB13 to RB21 are assigned to the mobile station 332 regarding the PDCCH transmitted at the subframe SUB#n+10. The mobile station 333 retransmits the PUSCH using RB14 to RB21 as described above. Therefore, the mobile station 332 and the mobile station 333 use the RB14 to RB21 at the same time as illustrated in FIG. 6C. Since the PUSCH transmitted from the mobile station 333 is an unintended interference source for the base station 32, the interference power in the base station 32 increases in the RB14 to RB21 as illustrated in FIG. 6D. Therefore, there is a possibility that the base station 32 is not able to normally receive the PUSCH transmitted from the mobile station 332 at the subframe SUB#n+14.

As illustrated in FIG. 6G, if the decoding result of the PUSCH received from the mobile station 332 at the subframe SUB#n+18 is NG, the base station 32 carries out a non-adaptiveHARQ retransmitting process by transmitting the PHICH of a NACK signal to the mobile station 332 or an adaptiveHARQ retransmitting process by transmitting the PDCCH to the mobile station 332.

If a retransmission request process has been carried out to any one of the mobile stations 33, the base station 32 determines whether or not there is any mobile station 33 which transmits the unintended PUSCH in the same manner as the mobile station 333 in this embodiment in accordance with, for example, the communication history or received interference power. If it is determined that there is a mobile station 333 which transmits an unintended PUSCH, the base station 32 retransmits, at the subframe SUB#n+18, the PHICH of the ACK signal to the mobile station 333 to stop transmission of the PUSCH.

As illustrated in FIGS. 6B and 6D, the interference power of the RB14 to RB21 in the base station 32 with respect to the PUSCH at the subframe SUB#n+14 is greater than the interference power of the RB14 to RB21 in the base station 32 with respect to the PUSCH at the subframe SUB#n+6. The mobile station 333 then stops transmission of the unintended PUSCH by the base station 32 retransmitting the PHICH of the ACK signal to the mobile station 333 at the subframe SUB#n+18. Therefore, the interference power of the RB14 to RB21 in the base station 32 with respect to the PUSCH at the subframe SUB#n+22 becomes low again as illustrated in FIG. 6F. As described above, it is possible to restore the normal communication status at an early stage by retransmitting, in accordance with the interference power, the PHICH of the ACK signal to the mobile station 33 which is transmitting the unintended PUSCH.

The base station 32 may retransmit the PHICH of the ACK signal regardless of whether the PHICH of the ACK signal has been normally received by the mobile station 33. That is, the base station 32 may compulsorily stop the retransmitting process of the data from the mobile station 33 that has not been able to receive the first PHICH of the ACK signal.

FIG. 7 is an interference power management table 70 used to manage the interference power on the RB basis. The interference power on the RB basis received at each subframe is recorded in the interference power management table 70. The interference power of each RB is calculated in the pilot signal demodulator 24 of the base station 32. The interference power management table 70 is stored in the storage 28 of the base station 32.

In the interference power management table 70 of FIG. 7, a row 71 represents the number of the RB. A row 73 represents the interference power in each RB received by the base station 32 at the subframe SUB#n+6. A row 74 represents the interference power in each RB received by the base station 32 at the subframe SUB#n+14. A row 75 represents the interference power in each RB received by the base station 32 at the subframe SUB#n+22.

The interference power received by the base station 32 at the subframe SUB#n+6 and the SUB#n+22 is −110 [dBm] in each RB. The interference power received at the subframe SUB#n+14 is −105 [dBm] in the RB14 to RB21, and is −110 [dBm] in the rest of the RBs.

As described above, the interference power management table 70 stores the interference power on the RB basis received at each subframe. Accordingly, the controller 3 of the base station 32 may specify the subframe and the RB with greater interference power by referring to the interference power management table 70 stored in the storage 28.

FIG. 8 is a retransmission prediction management table 80 to predict unintended PUSCH retransmission by the mobile station 33 which has transmitted the PHICH of the ACK signal. Information about the unintended PUSCH retransmission which may be received at each subframe is recorded in the retransmission prediction management table 80. The retransmission prediction management table 80 is stored in the storage 28 of the base station 32.

A row 86 represents information about the unintended PUSCH retransmission which the base station 32 may receive at the subframe SUB#n+6. A row 87 represents information about the unintended PUSCH retransmission which the base station 32 may receive at the subframe SUB#n+14. A row 88 represents information about the unintended PUSCH retransmission which the base station 32 may receive at the subframe SUB#n+22.

Columns 82, 83 and 84 represent different pieces of information about the unintended PUSCH retransmission. In this embodiment, the unintended PUSCH retransmission occurs only in the mobile station 333. The column 82 represents information about the PUSCH retransmission which may be processed in the mobile station 333 on the subframe basis. The management numbers #0, #1 and #2 of the columns 82, 83 and 84 are assigned to respective mobile stations 33.

The information recorded in the retransmission prediction management table 80 includes: the number of the mobile station which may retransmit the unintended PUSCH; the RB area to which the PUSCH is retransmitted; nDMRS; and the timing at which the mobile station 33 transmitted the PUSCH that is a cause of transmission of the PHICH of the ACK signal from the base station 32 to the mobile station 33 (CRC_OK timing). Here, the nDMRS is the information given at the latest DCI format0. CRC_OK represents that the receiver 2 of the base station 32 has succeeded in the decoding process of the received data.

A PHICH group (group) is a group of plural PHICHs mapped to a resource component. Different sequences (seq) are multiplexed in the same PHICH group. A resource of a certain PHICH is specified by [n(group, PHICH), n(seq, PHICH)]. Here, n(group, PHICH) is the group number of the PHICH and n(seq, PHICH) is a sequence number in the group. The leading RB number and nDMRS of the RB area are used to calculate [n(group, PHICH), n(seq, PHICH)] which specifies the resource of the PHICH.

The CRC_OK timing represents which interference power is made to be compared regarding the interference power used to determine whether the PUSCH has been transmitted from the mobile station 33. This is because it is less possible that the PUSCH from the mobile station 33 interferes with the PUSCH transmitted from another mobile station 33 at the timing of CRC_OK.

For example, the information recorded in the column 82 of the row 87 represents that it is possible that the PUSCH using nDMRS=0 is retransmitted at the subframe SUB#n+14 in the area of the RB14 to RB21 from the mobile station 333, and that prediction of occurrence of interference by the unintended PUSCH retransmission is determined on the basis of the interference power at the subframe SUB#n+6.

The information recorded in the column 82 of the row 88 is the same as the information recorded in the column 82 of the row 87. This information indicates that the same PUSCH retransmitting process as carried out at the subframe SUB#n+14 may be repeated at the subframe SUB#n+22. The maximum number of retransmission of the PUSCH transmission is determined in advance.

As described above, when interference due to unintended PUSCH retransmission occurs, the controller 3 of the base station 32 may predict, by referring to the retransmission prediction management table 80 stored in the storage 28, the mobile station 33 to which the PHICH of the ACK signal is to be transmitted.

Figure 9:
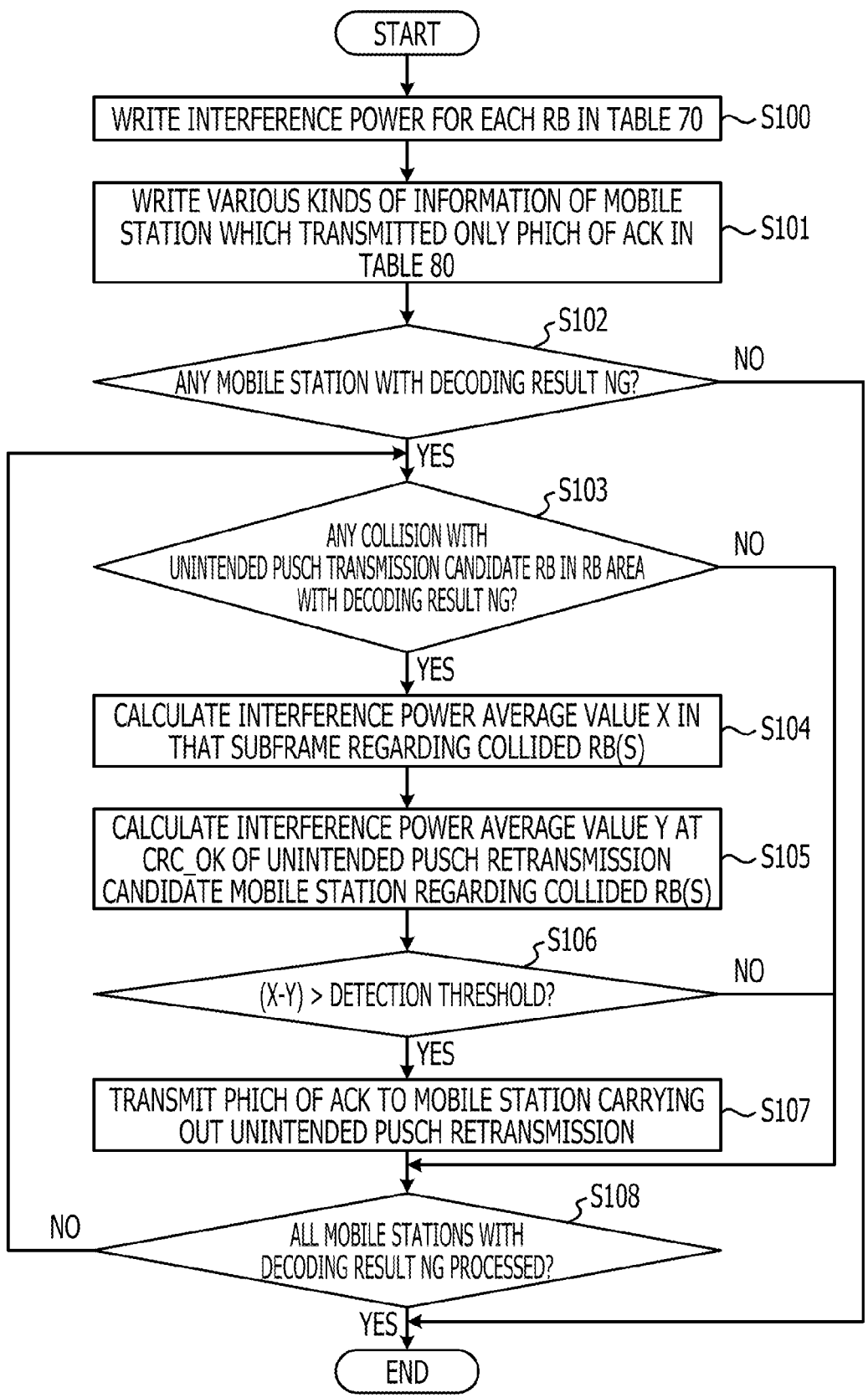
FIG. 9 is an ACK retransmission process flow of a controller of the base station.

FIG. 9 is an ACK retransmission process flow of the controller 3 of the base station 32. In accordance with a data transmission request received from any of the plural mobile stations 33, the controller 3 assigns the RBs for data transmission to the mobile station 33 which transmitted a data transmission request. The controller 3 makes the receiver 2 receive, in the assigned RB, data from the mobile station 33 which issued the data transmission request. When the receiver 2 successfully received the data, the controller 3 makes the transmitter 1 transmit the ACK signal to the mobile station 33 which issued the data transmission request. The controller 3 reassigns the RBs in connection with wireless transmission of a reception acknowledgement signal, and makes the transmitter 1 retransmit the ACK signal to the mobile station 33 which transmitted the data. Details of the retransmission process carried out by the controller 3 will be described below.

The controller 3 writes the interference power for each RB input from the receiver 2 in the interference power management table 70 stored in the storage 28 (step S100).

In accordance with the result of scheduling, the controller 3 writes retransmission prediction information in the retransmission prediction management table 80 as a data transmission stop request in the HARQ process regarding the mobile station 33 which transmitted only the PHICH of the ACK signal (step S101). The retransmission prediction information is various kinds of information used for retransmission of the PHICH of the ACK signal in a case in which unintended PUSCH retransmission has been carried out.

The receiver 2 outputs the result of the decoding process to the controller 3. If the decoding process of the received data is not successfully carried out, the receiver 2 outputs a signal representing the decoding result NG to the controller 3. If the controller 3 detected a mobile station 33 of which decoding result is NG in accordance with the result of the decoding process output from the receiver 2 (step S102: YES), the controller 3 refers to the retransmission prediction management table 80 (step S103). If no mobile station 33 of which decoding result is NG was detected (step S102: NO), the controller 3 terminates the ACK retransmission process.

If it is determined, with reference to the retransmission prediction management table 80, that there is a collision with an unintended PUSCH transmission candidate RB in the RB area of which decoding result is NG (step S103: YES), the controller 3 calculates, regarding the collided RB area, an average value of the interference power in the subframe at which the collision occurred as X (step S104). If it is determined, with reference to the retransmission prediction management table 80, that there is no collision with an unintended PUSCH transmission candidate RB in the RB area of which decoding result is NG (step S103: NO), the controller 3 starts checking other mobile stations 33 in which the decoding result of NG (step S108).

Then, the controller 3 calculates an average value of the interference power at the timing of CRC_OK of the unintended PUSCH retransmission candidate mobile station 33 as Y regarding the collision RB area with reference to the retransmission prediction management table 80 (step S105).

The controller 3 stores a detection threshold for the detection of the interference between signals in the storage 28 in advance. For example, the detection threshold may be determined in accordance with the transmission power of the mobile station 33 which is expected to carry out unintended PUSCH retransmission, or may be determined as a threshold multiplied by a coefficient alpha in consideration of the uplink power control.

If the difference between the average values X and Y (X−Y) calculated in steps S104 and S105 is larger than the detection threshold (step S106: YES), the controller 3 outputs a control signal to the transmitter 1 to retransmit the PHICH of the ACK signal to the mobile station 33 which is carrying out the unintended PUSCH retransmission (step S107). If the difference (X−Y) is below the detection threshold (step S106: NO), the controller 3 starts checking other mobile stations 33 of which decoding result is NG (step S108).

If evaluation of the interference between signals about all the mobile stations 33 of which decoding result in the receiver 2 is NG has been completed (step S108: YES), the controller 3 terminates the PHICH of the ACK signal retransmitting process. If evaluation of the interference between signals about all the mobile stations 33 of which decoding result is NG has not been completed (step S108: NO) the controller 3 repeats the processes from step S103 to step S107.

Although the mobile station which carries out unintended PUSCH retransmission is only the mobile station 333 in the retransmission prediction management table 80 in this embodiment, plural mobile stations 33 may carry out the non-adaptiveHARQ retransmission since they are not able to receive the PHICH of the ACK signal. For example, if unintended PUSCH retransmission is predicted in the mobile station 332, information about the predicted PUSCH retransmission is recorded in the column 83 of the retransmission prediction management table 80. The controller 3 may support a case in which the unintended PUSCH retransmission is carried out in plural mobile stations 33 by carrying out the processes of steps S103 to S107 to each of the mobile stations 332 and 333 with reference to the retransmission prediction management table 80.

In this embodiment, if the decoding result when the mobile station 332 carries out the PUSCH transmission in the RB13 to RB21 is NG, the controller 3 determines that a collision has occurred in the RB14 to RB21 with reference to the retransmission prediction management table 80 since the mobile station 333 carries out unintended PUSCH retransmission in the RB14 to RB21.

The controller 3 calculates the interference power average value X of the RB14 to RB21 at the subframe SUB#n+14 with reference to the interference power management table 70. In this embodiment, the interference power average value X of the RB14 to RB21 at the subframe SUB#n+14 with reference to the interference power management table 70 is −105 dBm/RB.

The controller 3 also determines that the timing at which the PUSCH received from the mobile station 333 became CRC_OK is the subframe SUB#n+6 with reference to the retransmission prediction management table 80. The controller 3 calculates the average value of the RB14 to RB21 at the subframe SUB#n+6 as the interference power average value Y. In this embodiment, the interference power average value Y is −110 dBm/RB.

For example, if the detection threshold is set to 4 dB, the difference of the average values (X−Y) is 5 dB, which is larger than the detection threshold. Therefore, the controller 3 carries out the PHICH of the ACK signal retransmitting process to the mobile station 333 with reference to the retransmission prediction management table 80.

As described above, if the decoding result in the receiver 2 is NG, the controller 3 of the base station 32 may carry out, with reference to the interference power management table 70 and the retransmission prediction management table 80, the retransmitting process of the PHICH of the ACK signal to the mobile station 33 which is carrying out the unintended PUSCH retransmission that may cause the interference between signals.

FIG. 10 is the SIR management table 90 used to manage the SIR of the signal received from the mobile station 33 if the decoding process result in the base station 32 is OK and reassignment of the radio resource is carried out. The SIR management table 90 is stored in the storage 28 of the base station 32.

A row 96 relates to the mobile stations to which the radio resource is reassigned at the subframe SUB#n+14 in accordance with the reception result at the subframe SUB#n+6. The row 96 represents information about an SIR value of the signal received from each mobile station 33 at the subframe SUB#n+6. A row 97 relates to the mobile stations to which the radio resource is reassigned at the subframe SUB#n+22 in accordance with the reception result at the subframe SUB#n+14. The row 97 represents information about an SIR value of the signal received from each mobile station 33 at the subframe SUB#n+14. A row 98 relates to the mobile stations to which the radio resource is reassigned at the subframe SUB#n+30 in accordance with the reception result at the subframe SUB#n+22. The row 98 represents information about an SIR value of the signal received from each mobile station 33 at the subframe SUB#n+22.

Columns 92, 93 and 94 represent the SIR of signals received from each mobile station 33 in which reassignment of the radio resource has been established. The management numbers #0, #1 and #2 of the columns 92, 93 and 94 are assigned to respective mobile stations 33. In this embodiment, reassignment of the radio resource is determined in accordance with the reception result at the subframe SUB#n+6 in the row 96. In the row 96, an SIR value xx of a signal received from the mobile station 330 is recorded in the column 92. An SIR value yy of a signal received from the mobile station 331 is recorded in the column 93. The SIR value xx of the signal received from the mobile station 332 is recorded in the column 94. In this embodiment, the base station 32 transmits the PHICH of the ACK signal at the subframe SUB#n+10 to the mobile station 333. Therefore, reassignment of the resource to the mobile station 333 is not made at the subframe SUB#n+14.

The controller 3 of the base station 32 records the SIR of the received signal when the decoding result is NG. Then, the controller 3 may predict that the decoding result NG is caused by the unintended PUSCH retransmission from the mobile station 33 by comparing the SIR with the value of the SIR at the timing at which the decoding result OK is recorded in the SIR management table.

FIG. 11 is an ACK retransmission process flow of the controller 3 in the base station 32 regarding an RB area assigned to the mobile station 33 of which decoding result is NG. In accordance with the result of scheduling, the controller 3 writes information in the retransmission prediction management table 80 as a data transmission stop request in the HARQ process regarding the mobile station 33 which transmitted only the PHICH of the ACK signal (step S201). The information is various kinds of information used for retransmission of the PHICH of the ACK signal in a case in which unintended PUSCH retransmission has been carried out.

As a result of scheduling, the controller 3 writes, the SIR value of the signal received from the mobile station 33 to which the radio resource is reassigned in the HARQ process, in the SIR management table 90 as A (step S202).

The receiver 2 outputs the result of the decoding process to the controller 3. If the controller 3 detected a mobile station 33 of which decoding result is NG in accordance with the result of the decoding process output from the receiver 2 (step S203: YES), the controller 3 refers to the retransmission prediction management table 80 (step S204). If no mobile station 33 of which decoding result is NG was detected (step S203: NO), the controller 3 terminates the ACK retransmission process.

If it is determined, with reference to the retransmission prediction management table 80, that there is a collision with an unintended PUSCH transmission candidate RB in the RB area of which decoding result is NG (step S204: YES), the controller 3 calculates the SIR value of the signal received from the mobile station 33 at the timing at which the decoding result is NG as B (step S205). If it is determined that there is no collision with an unintended PUSCH transmission candidate RB in the RB area of which decoding result is NG (step S204: NO), the controller 3 proceeds to a determination process of step S208.

The controller 3 stores a detection threshold for the detection of the interference between signals in the storage 28 in advance. For example, the detection threshold may be determined in accordance with the transmission power of the mobile station 33 which is expected to carry out unintended PUSCH retransmission, or may be determined as a threshold multiplied by a coefficient alpha in consideration of the uplink power control.

If the difference between the reception SIR values (A−B) is greater than the detection threshold (step S206: YES), the controller 3 outputs a control signal to the transmitter 1 to retransmit the PHICH of the ACK signal to the mobile station 33 which is carrying out the unintended PUSCH retransmission (step S207). If the difference (A−B) is below the detection threshold (step S206: NO), the controller 3 starts checking other mobile stations 33 of which decoding result is NG (step S208).

If evaluation of the interference between signals about all the mobile stations 33 of which decoding result in the receiver 2 is NG has been completed (step S208: YES), the controller 3 terminates the PHICH of the ACK signal retransmitting process. If evaluation of the interference between signals about all the mobile stations 33 of which decoding result is NG has not been completed (step S208: NO) the controller 3 repeats the processes from step S204 to step S207.

As described above, the controller 3 may predict that the decoding result NG is caused by the unintended PUSCH retransmission from the mobile station 33, by comparing the SIR value of the received signal when the decoding result is NG with the value of the SIR at the timing at which the decoding result is OK recorded in the SIR management table. The controller 3 may stop the unintended PUSCH retransmission from the mobile station 33 which causes the decoding result NG by retransmitting the PHICH of the ACK signal to the predicted mobile station 33. In the determination with reference to the interference power management table 70 of FIG. 9, an average value of plural RBs is calculated. However, in the determination with reference to the SIR management table of FIG. 11, the average value is not calculated and thus the number of process steps may be reduced. According to the embodiment described above, retransmission of data is not carried out from a mobile station which was not able to normally receive an ACK signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A base station comprising:
a receiver configured to receive data wirelessly transmitted from one of plural mobile stations which repeatedly transmit the data until a reception acknowledgement signal representing that the data has been received by the base station is received;
a transmitter configured to wirelessly transmit data to the plural mobile stations; and
a controller configured to
assign a radio resource for data transmission to a mobile station of the plural mobile stations in accordance with a data transmission request received from the mobile station,
make the receiver receive data from the mobile station in the assigned radio resource,
when the receiver has received the data from the mobile station, make the transmitter transmit the reception acknowledgement signal to the mobile station, and
when the radio resource is reassigned in association with the wireless transmission of the reception acknowledgement signal, make the transmitter retransmit the reception acknowledgement signal to the mobile station.

2. The base station according to claim 1, wherein:
the receiver includes a detection section configured to detect an interference power value which is a power value of noise interfering with received data; and
when the receiver fails to receive data, the controller determines whether or not to retransmit the reception acknowledgement signal in accordance with the interference power value relating the data.

3. The base station according to claim 2, further comprising:
a storage configured to store an interference power value detected from data received from the plural mobile stations, and store retransmission prediction information for predicting retransmission of the reception acknowledgement signal by the transmitter when the reception acknowledgement signal has not been received by the mobile station, wherein
the controller is configured to,
when the receiver fails to receive data, refer to the interference power value stored in the storage in accordance with the retransmission prediction information,
calculate a first interference power value which is an average value of interference power values in a radio resource which failed to receive the data, and
retransmit the reception acknowledgement signal when a difference between a second interference power value and the first interference power value is greater than a given threshold, the second interference power value being an average value of interference power values in a radio resource which successfully received data.

4. The base station according to claim 2, further comprising:
a storage configured to store a signal to noise ratio calculated from an interference power value detected from data received from plural mobile stations and a signal power value of the data, and store retransmission prediction information for predicting retransmission of the reception acknowledgement signal by the transmitter when the reception acknowledgement signal has not been received by the mobile station, wherein
the controller is configured to,
when the receiver fails to receive data, refer to the signal to noise ratio stored in the storage in accordance with the retransmission prediction information,
make the detection unit calculate a first signal to noise ratio which is a signal to noise ratio in a radio resource which failed to receive the data, and
retransmit the reception acknowledgement signal when a difference between a second signal to noise ratio and the first signal to noise ratio is greater than a given threshold, the second signal to noise ratio being a signal to noise ratio in a radio resource which successfully received data.

5. A communication system comprising:
plural mobile stations; and
a base station, wherein
the plural mobile stations are each provided with a transmission and reception section configured to wirelessly transmit data repeatedly until a reception acknowledgement signal representing that the transmitted data has been received by the base station is received,
the base station includes
a receiver configured to receive the data from the plural mobile stations,
a transmitter configured to wirelessly transmit data to the plural mobile stations, and
a controller configured to
assign a radio resource for data transmission to a mobile station of the plural mobile stations in accordance with a data transmission request received from the mobile station,
make the receiver receive data from the mobile station in the assigned radio resource,
when the receiver has received the data from the mobile station, make the transmitter transmit the reception acknowledgement signal to the mobile station, and
when the radio resource is reassigned in association with the wireless transmission of the reception acknowledgement signal, make the transmitter retransmit the reception acknowledgement signal to the mobile station.

6. The communication system according to claim 5, wherein:
the receiver includes a detection section which detects an interference power value which is a power value of noise interfering with received data; and
when the receiver fails to receive, the controller determines whether or not to retransmit the reception acknowledgement signal in accordance with the interference power value relating the data.

7. The communication system according to claim 6, wherein
the base station further includes
a storage configured to store an interference power value detected from data received from the plural mobile stations, and store retransmission prediction information for predicting retransmission of the reception acknowledgement signal by the transmitter when the reception acknowledgement signal has not been received by the mobile station, and
the controller is configured to,
when the receiver fails to receive data, refer to the interference power value stored in the storage in accordance with the retransmission prediction information,
make the detection unit calculate a first interference power value which is an average value of interference power values in a radio resource which failed to receive the data, and
retransmit the reception acknowledgement signal when a difference between a second interference power value and the first interference power value is greater than a given threshold, the second interference power value being an average value of interference power values in a radio resource which successfully received data.

8. The communication system according to claim 6, wherein
the base station further includes
a storage configured to store a signal to noise ratio calculated from an interference power value detected from data received from plural mobile stations and a signal power value of the data, and store retransmission prediction information for predicting retransmission of the reception acknowledgement signal by the transmitter when the reception acknowledgement signal has not been received by the mobile station, and
the controller is configured to,
when the receiver fails to receive data, refer to the signal to noise ratio stored in the storage in accordance with the retransmission prediction information,
make the detection section calculate a first signal to noise ratio which is a signal to noise ratio in a radio resource which failed to receive the data, and
retransmit the reception acknowledgement signal when a difference between a second signal to noise ratio and the first signal to noise ratio is greater than a given threshold, the second signal to noise ratio being a signal to noise ratio in a radio resource which successfully received data.

9. A communication method, comprising:
assigning, at a base station, a radio resource for data transmission to one of plural mobile stations in accordance with a data transmission request received from the mobile station, the plural mobile stations wirelessly transmitting data repeatedly until a reception acknowledgement signal representing that the transmitted data has been received by the base station is received;
receiving, at the base station, the data from the mobile station in the assigned radio resource;
when the data from the mobile station has received, transmitting the reception acknowledgement signal to the mobile station; and
when the radio resource is reassigned in association with the wireless transmission of the reception acknowledgement signal, retransmitting the reception acknowledgement signal to the mobile station.

10. The communication method according to claim 9, further comprising:
detecting an interference power value which is a power value of noise interfering with the received data; and
when data is failed to receive, determining whether or not to retransmit the reception acknowledgement signal in accordance with the interference power value relating the data.

11. The communication method according to claim 10, further comprising:
storing, in a storage, an interference power value detected from data received from the plural mobile stations, and retransmission prediction information for predicting retransmission of the reception acknowledgement signal when the reception acknowledgement signal has not been received by the mobile station;
when data is failed to receive, referring to the interference power value stored in the storage in accordance with the retransmission prediction information;
obtaining a first interference power value which is an average value of interference power values in a radio resource which failed to receive the data; and
retransmitting the reception acknowledgement signal when a difference between a second interference power value and the first interference power value is greater than a given threshold, the second interference power value being an average value of interference power values in a radio resource which successfully received data.

12. The communication method according to claim 10, further comprising:
- calculating a signal to noise ratio from an interference power value detected from data received from the plural mobile stations and a signal power value of the data;
- storing, in a storage, the signal to noise ratio and transmission prediction information for predicting retransmission of the reception acknowledgement signal when the reception acknowledgement signal has not been received by the mobile station;
- when the data is failed to receive, referring to the signal to noise ratio stored in the storage in accordance with the retransmission prediction information;
- obtaining a first signal to noise ratio which is a signal to noise ratio in a radio resource which failed to receive the data; and
- retransmitting the reception acknowledgement signal when a difference between a second signal to noise ratio and the first signal to noise ratio is greater than a given threshold, the second signal to noise ratio being a signal to noise ratio in a radio resource which successfully received the data.

* * * * *